United States Patent [19]

Hammarberg et al.

[11] Patent Number: 5,185,767
[45] Date of Patent: Feb. 9, 1993

[54] METHOD AND ARRANGEMENT FOR REGENERATING TIMING INFORMATION FROM A PULSE TRAIN OF THE NRZ-TYPE

[75] Inventors: Lars E. Hammarberg, Haninge; Tomas A. Eriksson, Stockholm, both of Sweden

[73] Assignee: Telefonaktiebolaget L M Ericsson, Stockholm, Sweden

[21] Appl. No.: 620,715

[22] Filed: Dec. 3, 1990

[30] Foreign Application Priority Data

Jan. 4, 1990 [SE] Sweden .............................. 9000024

[51] Int. Cl.⁵ .......................................... H04L 7/027
[52] U.S. Cl. .................................. 375/110; 307/108; 307/269; 328/120
[58] Field of Search ................... 345/110; 333/19; 307/108, 269; 328/120; 364/732, 828

[56] References Cited

U.S. PATENT DOCUMENTS

| | | | |
|---|---|---|---|
| 2,957,045 | 10/1960 | Perry, Jr. | 375/119 |
| 3,209,261 | 9/1965 | Critchlow | 375/110 |
| 3,611,161 | 10/1971 | Claxton | 375/110 X |
| 3,944,932 | 3/1976 | Fong | 375/103 |
| 4,276,650 | 6/1981 | de Jager et al. | 375/110 |
| 4,371,975 | 2/1983 | Dugan | 375/120 |
| 4,392,068 | 7/1983 | Welles, II | 307/522 |
| 4,400,817 | 8/1983 | Sumner | 375/119 |

FOREIGN PATENT DOCUMENTS

| | | |
|---|---|---|
| 2141445 | 2/1973 | Fed. Rep. of Germany . |
| 312822 | 7/1969 | Sweden . |
| 2142195 | 1/1985 | United Kingdom . |

*Primary Examiner*—Curtis Kuntz
*Assistant Examiner*—Tesfaldet Bocure
*Attorney, Agent, or Firm*—Burns, Doane, Swecker & Mathis

[57] ABSTRACT

The present invention relates to a method and to an arrangement for regenerating timing pulses from an information-carrying pulse train of the NRZ-type. The method can be used in a telecommunication system to create a timing signal which is synchronous with the information-carrying pulse train, so as to enable the pulses of the generated timing signal to be used as clock pulses when reading information from the original pulse train. The information-carrying pulse train is differentiated and rectified in a known manner, wherein the rectified pulse train signal will contain solely positive or solely negative pulses originating from level shifts of the pulse train signal. A commutating filter is given a resonance frequency which corresponds to the frequency of the NRZ-signal, and the rectified pulse train signal is supplied to the commutating filter, which generates timing pulses during those periods in which no pulses occur in the rectified pulse train signal. The commutating filter produces a timing signal which contains one pulse for each bit in the original information-carrying pulse train.

9 Claims, 2 Drawing Sheets

METHOD AND ARRANGEMENT FOR REGENERATING TIMING INFORMATION FROM A PULSE TRAIN OF THE NRZ-TYPE

TECHNICAL FIELD

The invention relates to a method and an arrangement for regenerating timing pulses from an information-carrying pulse train of the NRZ-type.

PRIOR ART

One known method of transmitting information digitally in a pulse train is the NRZ-method (Non Return to Zero) and a modification thereof, namely NRZ1. In the NRZ-method, a binary one is represented by high level and a binary zero by low level, whereas in the NRZ$_1$-method, a binary one is represented by a shift in levels (low to high and high to low respectively), whereas a binary zero is represented by the level which remains unchanged (low or high).

Since the mutually sequential bits in the binary coded message transmitted are not necessarily represented by a pulse, it is necessary to regenerate timing pulses which can be used in the separate bit interval to read the signal level in the binary coded message. Since quite a number of bit intervals can pass between the level shifts that can be used to regenerate said timing pulses, slots will occur in the regenerated timing signal when timing pulses are generated solely upon the occurrence of level shifts.

It is known, for instance, from Swedish patent specification 312822, the German Published patent application 21 41 445 and the U.S. patent specification 2,957,045 to generate a continuous clock pulse train, by derivating the incoming pulses and delivering the derived pulses to an oscillation circuit of high Q-value. The oscillation circuit, which has a resonance frequency that coincides with the frequency of the incoming pulses, is excited by the pulses and produces a continuous wave which subsequent to pulse formation and phase adjustment can be used as clock pulses when reading the binary coded message.

It is also known to use a phase locked loop (PLL-circuit) instead of an LC-type oscillation circuit, in order to regenerate the timing of the information-carrying pulse train of the NRZ-type.

DISCLOSURE OF THE INVENTION

The known technique for regenerating timing pulses or clock pulses from the information-carrying pulse train requires the presence of a high-quality resonator for the timing pulse frequency in both the oscillation circuit and in the PLL-circuit. A resonator of this kind is expensive and normally has to be trimmed when fitted. Alternatively, a SAW-filter can be used, although such a filter is highly expensive.

The inventive method and arrangement solves these problems, by regenerating timing pulses from the information-carrying pulse train with the aid of a commutating filter. The inventive arrangement is applied in a telecommunication system, for instance in a telephone exchange having an exchange clock, said pulse train having a frequency which corresponds to the exchange clock frequency with any desired phase position. In addition to a derivating and rectifying circuit, the arrangement also includes the aforesaid commutating filter, which is operative to regenerate timing pulses during those periods in which the information-carrying pulse train includes no level shifts. The commutating filter includes a number of capacitors and a cyclic switch which functions to connect the capacitors to the signal rectified in the rectifier in a cyclic sequence. The commutating filter is given a resonance frequency that is equal to the frequency of the exchange clock, which means that the switch will switch each of the capacitors sequentially to the rectified signal once for each clock period. With each clock period in which a pulse appears in the rectified signal, part of the capacitors are charged and for each clock period which does not contain a pulse, the earlier charged capacitors are discharged, whereby the commutating filter delivers a continuous clock signal which contains one pulse for each bit in the original information-carrying pulse train.

Several advantages are afforded by the use of a commutating filter in accordance with the invention, instead of an oscillation circuit or a PLL-circuit in accordance with known technique. The resonance frequency of the commutating filter is not dependent on the accuracy of the filter components, but depends on the accuracy of the exchange clock. Consequently, the components of the commutating filter need not have a high degree of accuracy, which makes the filter relatively inexpensive. Neither is it necessary to trim the filter. A commutating filter is also easier to integrate on silicon than the earlier mentioned circuits used according to known techniques. Finally, the commutating filter possesses a highly advantageous property such that when the frequency of the NRZ-signal drives slowly, the charge distribution in the filter is displaced so that the generated timing signal will be constantly synchronous with the NRZ-signal.

BRIEF DESCRIPTION OF THE DRAWING

The invention will now be described in more detail with reference to an inventive method and arrangement illustrated in the accompanying drawing.

BEST MODE OF CARRYING OUT THE INVENTION

Figure 1:
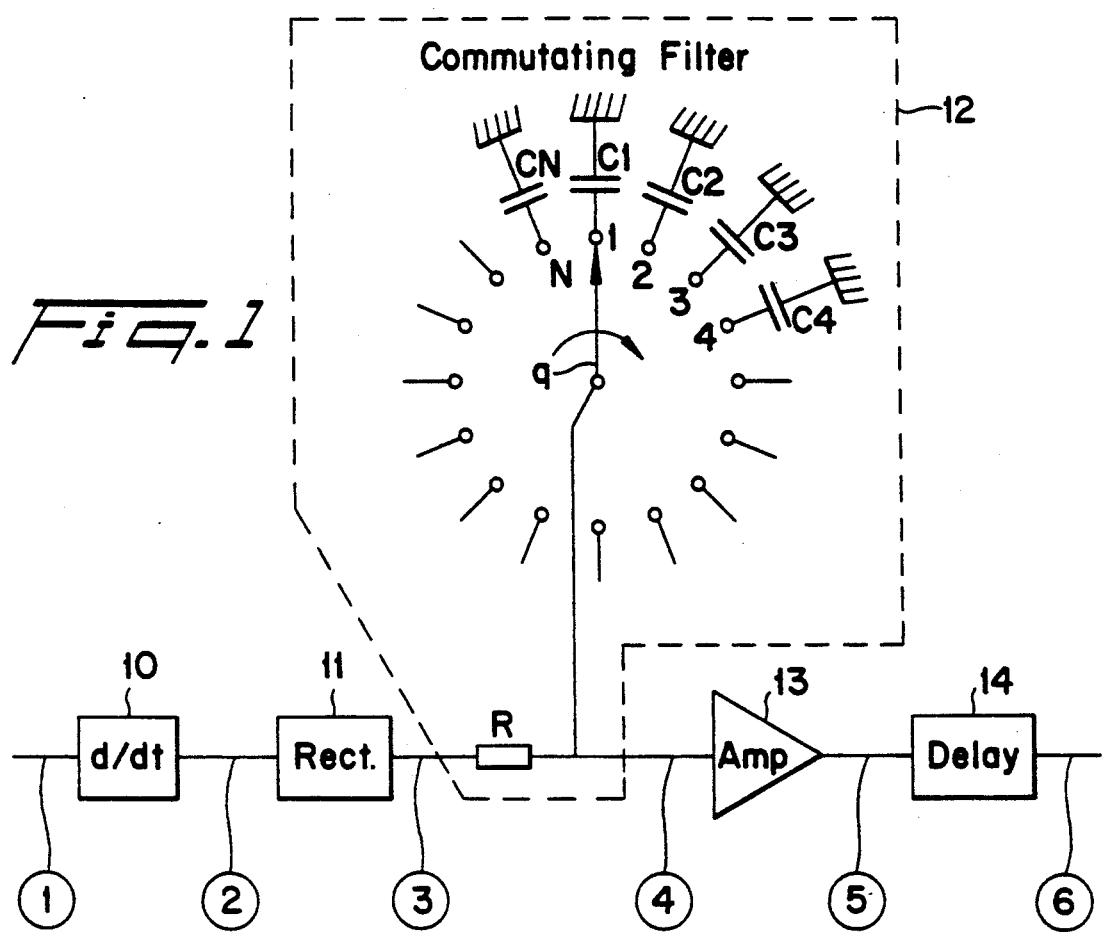
FIG. 1 illustrates the inventive arrangement.

The present invention relates to a method and to an arrangement for regenerating timing information from an information-carrying bit-divided pulse train of the NRZ-type. The method and the arrangement are intended for use in a telecommunication system, for example a telephone exchange having an exchange clock which determines the timing of outgoing signals. Signals arriving at the exchange will not normally deviate from this timing, although the phase position is totally random, due to conductor delays. Thus, an information-carrying pulse train of the NRZ-type will have in the telephone exchange a frequency which corresponds to the clock frequency but an arbitrary phase position. The object of the inventive method is to provide a timing signal which is synchronous with the information-carrying pulse train, so that the clock signal pulses can be used as clock pulses when reading the information in the pulse train. The timing signal is created from the information-carrying pulse train with the aid of an arrangement illustrated in FIG. 1. The information-carrying pulse train is also referred to as the pulse train signal or the NRZ-signal.

The arrangement includes a derivating circuit 10 for differentiation of the pulse train signal 1. Connected to the output of the derivating circuit 10 is a rectifier 11 which functions to rectify the signal delivered from the derivating circuit 10. Connected to the output of the rectifier 11 is a commutating filter 12 which functions to generate timing pulses over periods in which no level shifts occur in the original pulse train signal 1. The commutating filter 12 produces a timing signal 4 which is delivered to an amplifier 13 connected to the filter 12. Finally, the arrangement includes a delay circuit 14 whose input is connected to the output of the amplifier 13. The delay circuit 14 produces on its output a delayed timing signal which can be used when reading information from the original pulse train 1.

Figure 2:
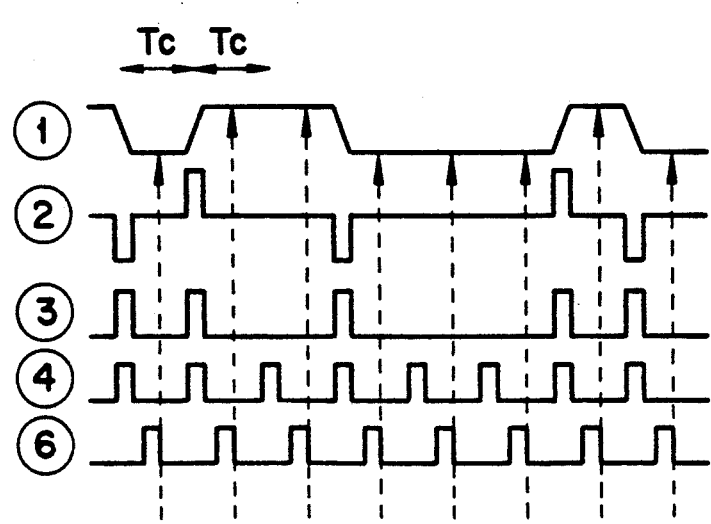
FIG. 2 is a signal diagram illustrating the influence of the arrangement on an incoming signal.

FIG. 2 illustrates an example of a pulse train signal 1 of the NRZ-type. Each bit in the signal occupies a time period corresponding to the clock period $T_c$ of the exchange clock, since the NRZ-signal has the same frequency as the exchange clock. In the illustrated embodiment, the level shift of the pulse train signal 1 is exaggeratingly slow, since these level shifts are used to generate the aforesaid timing signal. The creation of a timing signal is commenced by first differentiating the pulse train 1 in the derivating circuit 10, in a known manner. The differentiated pulse train signal 2 contains pulses at level changes in the information-carrying pulse train 1, these pulses being positive pulses in the case of changes from low to high levels and negative pulses in the case of changes from high to low levels. The differentiated pulse train signal 2 is then rectified in the rectifier 11, in a known manner, wherewith the negative pulses are converted to positive pulses in the rectified pulse-train signal 3. The rectified pulse-train signal 3 will only contain pulses when the original pulse train signal 1 changes from one level to another, and in order to create timing pulses also during those limited periods in which the pulse train 1 does not change levels, the rectified pulse train 3 is delivered to the commutating filter 12.

The commutating filter 12 includes a number of capacitors $C_1, \ldots C_N$, a resistor R and a cyclicly operating switch g which couples the capacitors in a cyclic sequence to said rectified pulse train signal 3 between the resistor R and the input of the amplifier 13. The commutating filter 12 is given a resonance frequency which corresponds to the frequency of the exchange clock, wherein the switch g, when seen operationally, rotates one revolution during the clock period $T_c$, i.e. each of the capacitors $C_1, \ldots C_N$ is coupled to the rectified pulse train signal 3 once during the clock period. If, at the beginning of the clock period, the switch g connects the rectified pulse train signal to, for instance, the first capacitor $C_1$, the switch will consequently connect the rectified pulse train signal to the N:th capacitor $C_N$ at the end of the clock period. The commutating filter 12 will allow signals with retained curve shape to pass through if these signals have a frequency which is equal to or almost equal to the resonance frequency of the filter, since harmonic overtones are also allowed to pass through. Since the rectified pulse train 3 has the same frequency as the resonance frequency of the commutating filter, the pulses will always charge the same capacitors in the commutating filter 12. Only a part of the capacitors $C_1, \ldots C_N$ are charged, since pulses only occur during a part of the time period $T_c$. When there are no pulses in the rectified pulse train signal 3, i.e. no level shift between two bits in the original signal 1, the capacitors earlier charged are discharged, wherewith pulses are regenerated in a timing signal 4 on the input of the amplifier 13. The regenerated timing signal 4 will therewith contain one timing pulse for each bit in the original pulse train 1. In order to ensure that the capacitors remain charged for as long as possible, so as to enable several pulses to be regenerated sequentially, the time constant N R C of the filter is given a very large value in relation to the period time Tc of the exchange clock. Since the mean value of the voltage level on the timing pulses 4 from the commutating filter 12 is half the pulse level in the rectified pulse train 3 the arrangement also includes an amplifier 13 in which the timing pulses 4 are amplified. Thus, an amplified timing signal 5 (not shown in the signal diagram) is produced on the output of the amplifier 13.

Subsequent to phase adjustment, the timing signal 4 shall be used to read the information in the original information-carrying pulse train 1. The generated timing signal 4 includes clock pulses at each bit shift in the pulse train 1. The timing signal 4 in the clock pulses shall be used to read the signal level in the information-carrying pulse train 1 at each individual bit interval. In order to enable the timing pulses in the generated timing signal 4 to be used to clock the information-carrying pulse train 1 in the centre of each bit, the amplified timing signal 5 is delayed through 180° in the delay circuit 14, so as to produce a delayed timing signal 6 suitable for reading purposes. As illustrated in FIG. 2 in broken lines, when reading is effected at the leading flanks of the pulses in the delayed timing signal 6, the pulse level will be read in the centre of each bit in the information-carrying pulse train 1. Alternatively, a rotating switch can be used to effect reading 180 out of phase with the earlier mentioned.

Hitherto, the invention has been described on the understanding that the frequency of the original pulse train 1, and thus also of the rectified pulse train 3, is precisely the same as the frequency of the exchange clock. However, it is possible that the frequency of the information-carrying pulse train 1 will drift slightly so that the frequency of the signal arriving at the commutating filter 12 will deviate somewhat from the given resonance frequency (which corresponds to the frequency of the exchange clock). Accordingly, the commutating filter 12 is influenced in a manner such that the charge state of the capacitors $C_1, \ldots C_N$ is slowly displaced through one revolution, so a to generate a timing signal 4 which is constantly synchronous with the NRZ-signal 1, despite this frequency change. The cycle time of the cyclic switch g is always constant and equal to the period time of the exchange clock. In order to provide sufficient time for the commutating filter 12 to accommodate this deviation in frequency so as to slowly displace the charge distribution of the capacitors, the filter components are selected so that the time constant N·R·C of the filter will be shorter than the shortest time of a frequency change.

The invention can also be applied when the NRZ-signal has a frequency which is completely different to the frequency of the exchange clock. For instance, the frequency of the NRZ-signal may be twice as high. In this case, the commutating filter is given a resonance frequency which corresponds to the frequency of the NRZ-signal, wherein the switch g obtains a cycle time which corresponds to the clock period of the NRZ-signal. The switch g will then connect each of the capacitors $C_1, \ldots C_N$ to the pulse train signal 3 with each period in the NRZ-signal. Thus, the commutating filter is always given a resonance frequency which corresponds to the frequency of the NRZ-signal.

Figure 3:
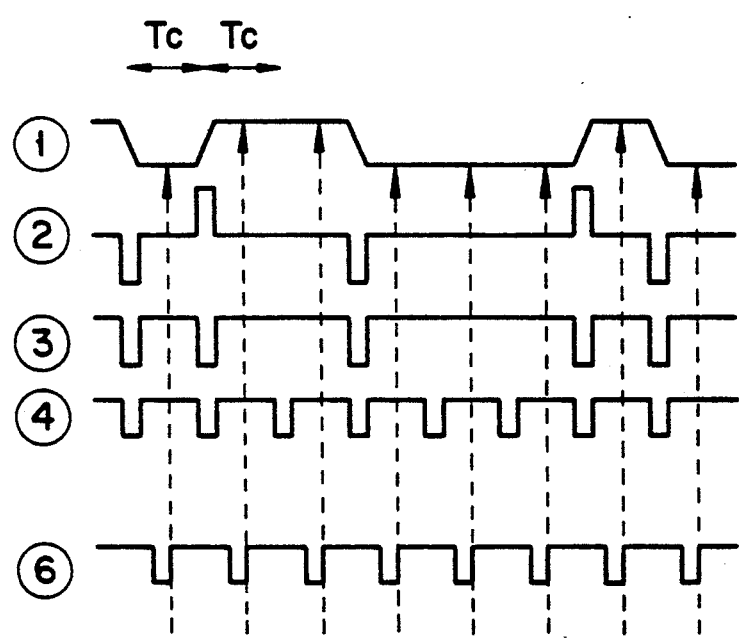
FIG. 3 illustrates waveforms generated according to another embodiment of the invention.

Instead of rectifying the negative pulses from the differentiating stage to positive pulses, it is conceivable to rectify the positive pulses to negative pulses. Such an alternate embodiment would operate in the same fashion as the exemplary embodiment described with respect to FIG. 2 except that the rectifying circuit 11 would convert the positive pulses to negative pulses. FIG. 3 illustrates how the pulse train signals of FIG. 2 would appear according to this exemplary embodiment of the present invention. In FIG. 3, pulse train signals corresponding to those of FIG. 2 are denotes using similar pulse train numbers. Accordingly, all of the pulses of pulse train signals 3, 4, and 5 will be negative pulses as a result of the operation of the rectifying circuit 11.

We claim:

1. A method of regenerating clock pulses from an input pulse train having a plurality of bits comprising the steps of:

differentiating said input pulse train to produce a differentiated signal;

rectifying said differentiated signal to produce a rectified signal having pulses of only one polarity; and sequentially connecting said rectified signal to each of a plurality of capacitors to generate a clock signal having clock pulses during clock periods in which no pulses occur in said rectified signal, whereby said clock signal has a clock pulse for each clock period.

2. The method of regenerating clock pulses of claim 1, further comprising the step of:

delaying said clock signal for a predetermined time period.

3. The method of regenerating clock pulses of claim 2 further comprising the step of:

using said delayed clock signal to read a signal level in a center of each bit in the input pulse train.

4. The method of regenerating clock pulses of claim 2 wherein said input pulse train comprises an NRZ-type signal.

5. A clock pulse regenerating circuit comprising:

differentiator means for receiving an input pulse train and outputting a differentiated signal;

rectifying means for receiving said differentiated signal and outputting a rectified signal having pulses of only one polarity; and, commutating filter means, including a plurality of capacitors and connecting means for sequentially connecting the plurality of capacitors to said rectified signal, for receiving said rectified signal and generating a clock signal having clock pulses during clock periods in which no pulses occur in said rectified signal, whereby said clock signal has a clock pulse for each clock period.

6. The clock pulse regenerating circuit of claim 5 further comprising:

delay means for delaying said clock signal by a predetermined time period.

7. The clock pulse regenerating circuit of claim 5 wherein said connecting means has a cycle time which corresponds to the clock period of the input pulse train.

8. The clock pulse regenerating circuit of claim 7 wherein said connecting means rotates in phase with an exchange clock.

9. The clock pulse regenerating circuit of claim 6 wherein said delay means further comprises:

a rotating switch which reads out said clock signal 180 degrees out of phase.

* * * * *